(12) United States Patent
Yang et al.

(10) Patent No.: US 12,284,542 B2
(45) Date of Patent: Apr. 22, 2025

(54) DYNAMIC TRIGGERING AND SKIPPING OF CHANNEL STATE FEEDBACK (CSF)

(71) Applicant: QUALCOMM Incorporated, San Diego, CA (US)

(72) Inventors: Wei Yang, San Diego, CA (US); Yi Huang, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 17/697,407

(22) Filed: Mar. 17, 2022

(65) Prior Publication Data

US 2022/0322126 A1 Oct. 6, 2022

Related U.S. Application Data

(60) Provisional application No. 63/169,742, filed on Apr. 1, 2021.

(51) Int. Cl.
*H04W 24/10* (2009.01)
*H04B 7/06* (2006.01)
*H04W 72/23* (2023.01)

(52) U.S. Cl.
CPC .......... *H04W 24/10* (2013.01); *H04B 7/0626* (2013.01); *H04B 7/0658* (2013.01); *H04W 72/23* (2023.01)

(58) Field of Classification Search
CPC .... H04W 24/10; H04W 72/23; H04B 7/0626; H04B 7/0658
USPC ........................................................ 370/252
See application file for complete search history.

(56) References Cited

U.S. PATENT DOCUMENTS

2015/0117380 A1* 4/2015 Zhang .................. H04L 5/0048
370/329
2019/0223033 A1* 7/2019 Nam .................... H04B 7/0805

OTHER PUBLICATIONS

Interdigital Inc: "CSI Feedback Enhancements for Enhanced URLLC/IIoT", 3GPP TSG RAN WG1 #102-e, 3GPP Draft, R1-2006071, 3GPP, Mobile Competence Centre, 650, Route Des Lucioles, F-06921 Sophia-Antipolis Cedex, France, vol. RAN WG1, No. e-Meeting, Aug. 17, 2020-Aug. 28, 2020, 5 Pages, Aug. 7, 2020, XP051915137, URL: https://ftp.3gpp.org/tsg_ran/WG1_RL1/TSGR1_102-e/Docs/R1-2006071.zip R1-2006071 CSI_Feedback.docx [retrieved on Aug. 7, 2020].
International Search Report and Written Opinion—PCT/US2022/020950—ISA/EPO—Jun. 29, 2022.

(Continued)

*Primary Examiner* — Christopher R Crompton
(74) *Attorney, Agent, or Firm* — QUALCOMM Incorporated

(57) ABSTRACT

Certain aspects of the present disclosure relate to wireless communications, and more particularly, to techniques for dynamically triggering or skipping channel state feedback (CSF). A method that may be performed by a user equipment (UE) includes receiving, from a network entity, a configuration indicating CSF reporting occasions, receiving a downlink (DL) transmission, and transmitting CSF on only some CSF reporting occasions after receiving the DL transmission when one or more trigger conditions are met. According to certain aspects, when one or more trigger conditions are not met, the UE skips at least some CSF reporting occasions.

30 Claims, 12 Drawing Sheets

(56) References Cited

OTHER PUBLICATIONS

NTT Docomo: "Remaining Issues on CSI Reporting", 3GPP TSG RAN WG1 Meeting #92, R1-1802470_CSI Reporting, 3GPP, Mobile Competence Centre, 650, Route Des Lucioles, F-06921 Sophia-Antipolis Cedex, France, vol. RAN WG1, No. Athens, Greece, Feb. 26, 2018-Mar. 2, 2018, 8 Pages, Feb. 17, 2018, XP051397976, URL: http://www.3gpp.org/ftp/tsg%5Fran/WG1%5FRL1/TSGR1%5F92/Docs/.

Qualcomm Incorporated: "Maintenance for CSI Reporting", 3GPP TSG RAN WG1 Meeting #92bis, R1-1804786, 3GPP, Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427053, pp. 1-15, URL: http://www.3gpp.org/ftp/Meetings%5F3GPP%5FSYNC/RAN1/Docs/.

* cited by examiner

400

405

RECEIVE, BY A USER EQUIPMENT (UE), FROM A NETWORK ENTITY, A CONFIGURATION INDICATING CHANNEL STATE FEEDBACK (CSF) REPORTING OCCASIONS

410

RECEIVE, BY THE UE, A DOWNLINK (DL) TRANSMISSION

415

TRANSMIT, BY THE UE, CSF ON ONLY SOME CSF REPORTING OCCASIONS, AFTER RECEIVING THE DL TRANSMISSION, WHEN ONE OR MORE TRIGGER CONDITIONS ARE MET

TRANSMIT, BY A NETWORK ENTITY, TO A USER EQUIPMENT (UE), A CONFIGURATION INDICATING CHANNEL STATE FEEDBACK (CSF) REPORTING OCCASIONS

510

TRANSMIT, BY THE NETWORK ENTITY, A DOWNLINK (DL) TRANSMISSION TO THE UE

515

RECEIVE, BY THE NETWORK ENTITY, CSF FROM THE UE ON ONLY SOME CSF REPORTING OCCASIONS, AFTER TRANSMITTING THE DL TRANSMISSION, WHEN ONE OR MORE TRIGGER CONDITIONS ARE MET

FIG. 5

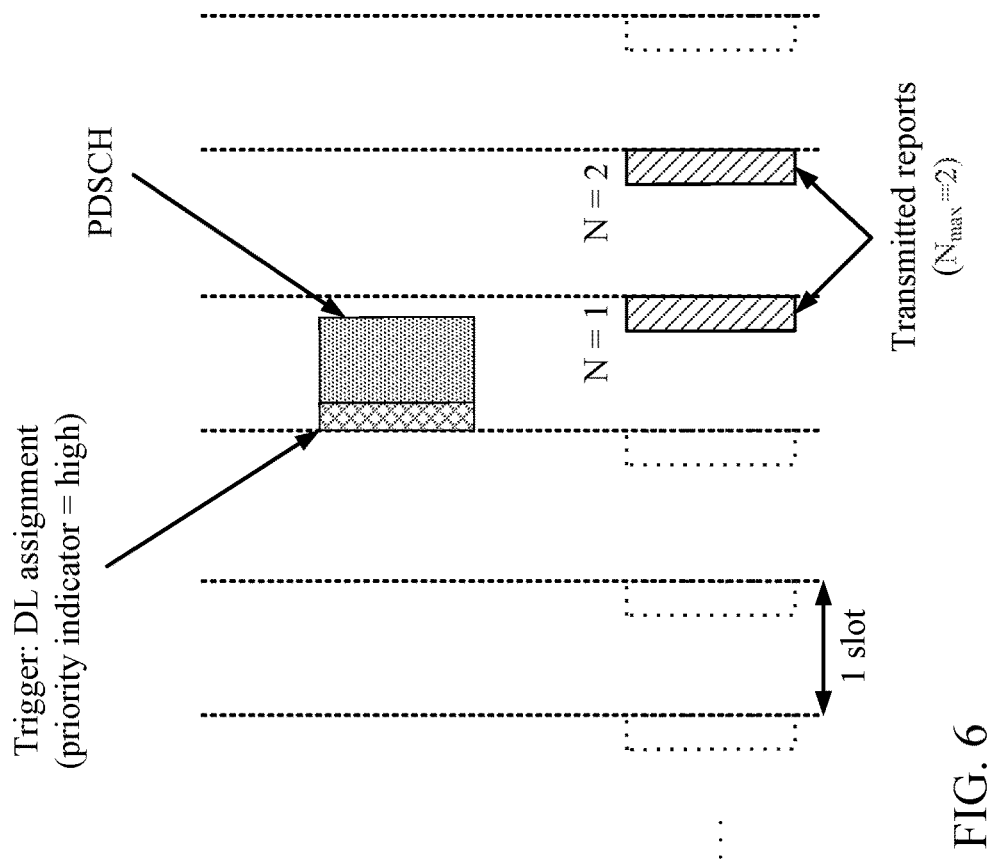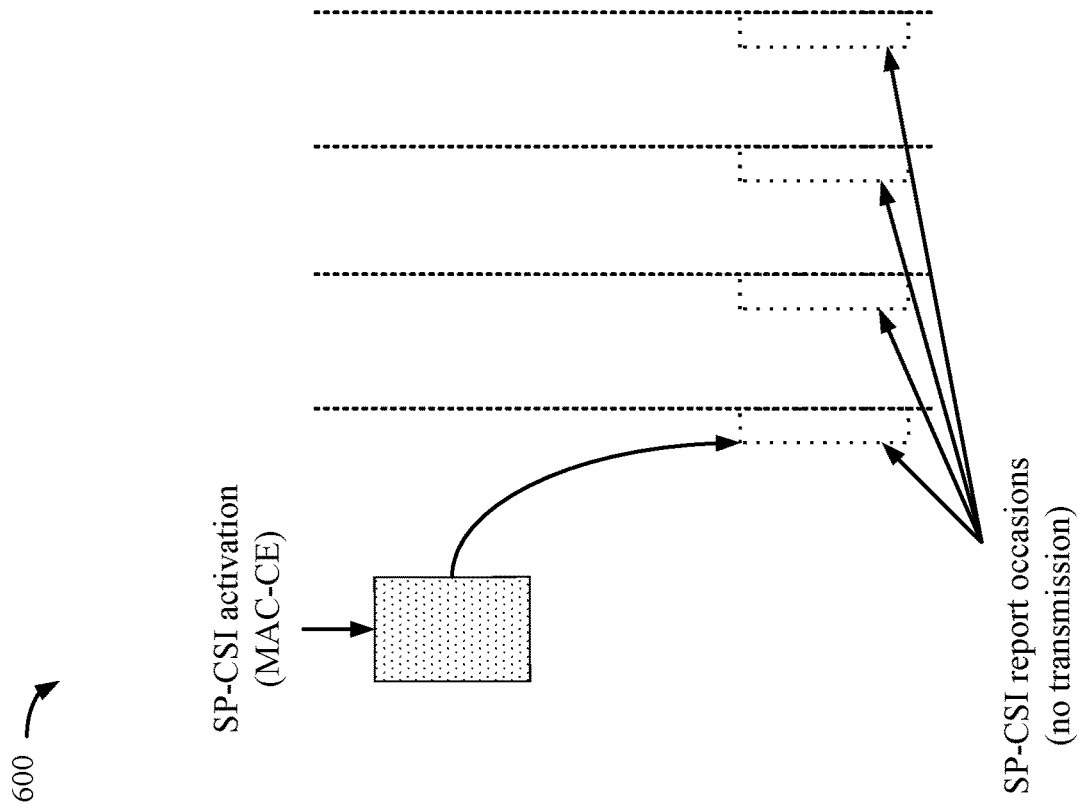
FIG. 6

DYNAMIC TRIGGERING AND SKIPPING OF CHANNEL STATE FEEDBACK (CSF)

CROSS-REFERENCE TO RELATED APPLICATION(S)

This application claims priority to U.S. Provisional Application No. 63/169,742 filed Apr. 1, 2021, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for dynamically triggering or skipping transmission(s) of channel state feedback (CSF).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), TRP, etc. A BS or DU may communicate with a set of UEs on downlink (DL) channels (e.g., for transmissions from a BS or to a UE) and uplink (UL) channels (e.g., for transmissions from a UE to a BS or DU).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the DL and on the UL. To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

One or more aspects of the subject matter described in this disclosure can be implemented in a method for wireless communications by a user equipment (UE). The method generally includes receiving, from a network entity, a configuration indicating channel state feedback (CSF) reporting occasions; receiving a downlink (DL) transmission; and transmitting CSF on only some CSF reporting occasions after receiving the DL transmission when one or more trigger conditions are met.

One or more aspects of the subject matter described in this disclosure can be implemented in a method for wireless communications by a network entity. The method generally includes transmitting, to a UE, a configuration indicating CSF reporting occasions; transmitting a DL transmission to the UE; and receiving CSF from the UE on only some CSF reporting occasions after transmitting the DL transmission when one or more trigger conditions are met.

One or more aspects of the subject matter described in this disclosure can be implemented in an apparatus for wireless communication by a UE. The apparatus generally includes a memory and at least one processor coupled with the memory. The at least one processor coupled with the memory is generally configured to receive, from a network entity, a configuration indicating CSF reporting occasions; receive a DL transmission; and transmit CSF on only some CSF reporting occasions after receiving the DL transmission when one or more trigger conditions are met.

One or more aspects of the subject matter described in this disclosure can be implemented in an apparatus for wireless communication by a network entity. The apparatus generally includes a memory and at least one processor coupled with the memory. The at least one processor coupled with the memory is generally configured to transmit, to a UE, a configuration indicating CSF reporting occasions; transmit a DL transmission to the UE; and receive CSF from the UE on only some CSF reporting occasions after transmitting the DL transmission when one or more trigger conditions are met.

One or more aspects of the subject matter described in this disclosure can be implemented in an apparatus for wireless communication. The apparatus generally includes means for receiving signaling indicating a beam update. The apparatus generally includes means for receiving, from a network entity, a configuration indicating CSF reporting occasions; means for receiving a DL transmission; and means for transmitting CSF on only some CSF reporting occasions after receiving the DL transmission when one or more trigger conditions are met.

One or more aspects of the subject matter described in this disclosure can be implemented in an apparatus for wireless communication. The apparatus generally includes means for transmitting, to a UE, a configuration indicating CSF reporting occasions; means for transmitting a DL transmission to the UE; and means for receiving CSF from the UE on only some CSF reporting occasions after transmitting the DL transmission when one or more trigger conditions are met.

One or more aspects of the subject matter described in this disclosure can be implemented in a computer readable medium having computer executable code stored thereon. The computer readable medium having computer executable code stored thereon generally includes code for receiving, from a network entity, a configuration indicating CSF reporting occasions; code for receiving a DL transmission; and code for transmitting CSF on only some CSF reporting occasions after receiving the DL transmission when one or more trigger conditions are met.

One or more aspects of the subject matter described in this disclosure can be implemented in a computer readable medium having computer executable code stored thereon. The computer readable medium having computer executable code stored thereon generally includes code for transmitting, to a UE, a configuration indicating CSF reporting occasions; code for transmitting a DL transmission to the UE; and code for receiving CSF from the UE on only some CSF reporting occasions after transmitting the DL transmission when one or more trigger conditions are met.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure, and the description may admit to other equally effective aspects.

FIG. 4 is a flow diagram illustrating example operations for wireless communication by a UE, in accordance with certain aspects of the present disclosure.

FIG. 5 is a flow diagram illustrating example operations for wireless communication by a network entity, in accordance with certain aspects of the present disclosure.

FIG. 6 illustrates example dynamic triggering of channel state feedback (CSF), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
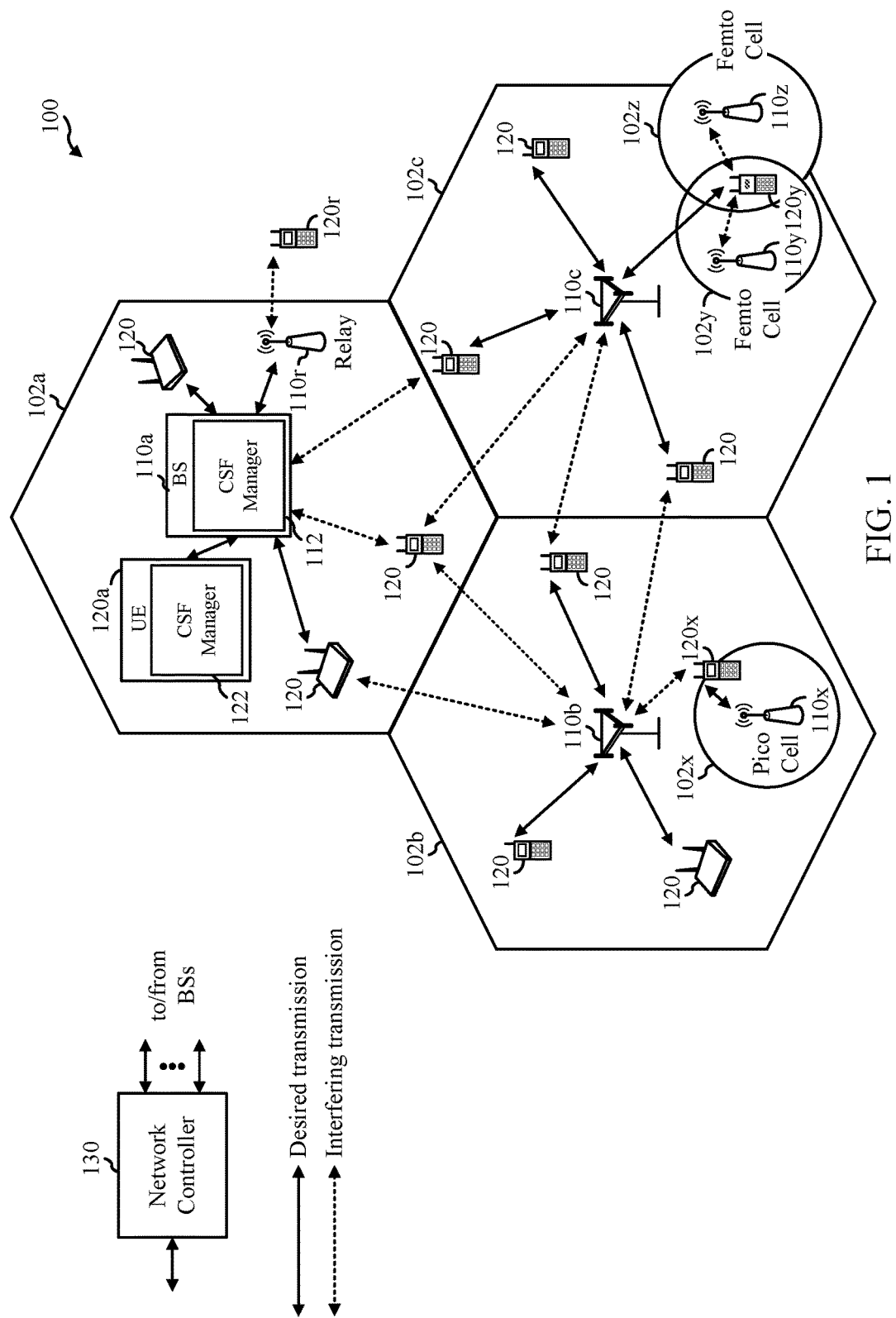
FIG. 1 is a block diagram conceptually illustrating an example telecommunications system, in accordance with certain aspects of the present disclosure.

Aspects of the present disclosure relate to wireless communications, and more particularly, to techniques for dynamically triggering or skipping transmission of channel state feedback (CSF) on periodic channel state information (P-CSI) or semi-persistent CSI (SP-CSI) reporting occasions. The techniques presented herein may help conserve power and make efficient use of resources by transmitting CSF, such as channel state information (CSI) reports, only in some reporting occasions and skipping transmission in other reporting occasions where CSF is not necessary. The techniques presented herein may also help a network entity (e.g., base station (BS)/gNB) know when to expect a CSF report The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as Long Term Evolution (LTE), code division multiple access (CDMA), time division multiple access (TDMA), frequency division multiple access (FDMA), orthogonal frequency division multiple access (OFDMA), single-carrier frequency division multiple access (SC-FDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as New Radio (NR) (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS).

NR is an emerging wireless communications technology under development in conjunction with the 5G Technology Forum (5GTF). 3GPP LTE and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine-type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 (e.g., a New Radio (NR)/5G network), in which aspects of the present disclosure may be performed. For example, wireless communication network 100 may include a user equipment (UE) 120 configured to perform operations 400 of FIG. 4 to transmit channel state feedback (CSF) to a network entity (e.g., such as a base station (BS) 110a) (performing operations 500 of FIG. 5). For example, UE 120a includes a CSF Manager 122 and BS 110a includes a CSF Manager 112. CSF Manager 122 may be configured for transmitting CSF on only some CSF reporting occasions, after receiving a downlink (DL) transmission, when one or more trigger conditions are met, in accordance with certain aspects of the present disclosure. Further, CSF 112 may be configured for receiving CSF on only some CSF reporting occasions, after transmitting a DL transmission, when one or more trigger conditions are met, in accordance with certain aspects of the present disclosure.

As illustrated in FIG. 1, wireless communication network 100 may include a number of BSs 110 and other network entities. ABS may be a station that communicates with UEs. Each BS 110 may provide communication coverage for a particular geographic area. In 3GPP, the term "cell" can refer to a coverage area of a NodeB (NB) and/or a NodeB subsystem serving this coverage area, depending on the context in which the term is used. In NR systems, the term "cell" and next generation NodeB (gNB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with a BS 110a and a UE 120r to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. Network controller 130 may communicate with BSs 110 via a backhaul. BSs 110 may also communicate with one another (e.g., directly or indirectly) via wireless or wireline backhaul.

UEs 120 (e.g., 120x, 120y, etc.) may be dispersed throughout wireless communication network 100, and each UE 120 may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, gaming device, reality augmentation device (augmented reality (AR), extended reality (XR), or virtual reality (VR)), or any other suitable device that is configured to communicate via a wireless or wired medium.

Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the DL and single-carrier frequency division multiplexing (SC-FDM) on the uplink (UL). OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz), and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 RBs), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the UL and DL and include support for half-duplex operation using time division duplex (TDD). Beamforming may be supported and beam direction may be dynamically configured. Multiple-input multiple-output (MIMO) transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some scenarios, air interface access may be scheduled. For example, a scheduling entity (e.g., a BS, Node B, eNB, gNB, or the like) can allocate resources for communication among some or all devices and equipment within its service area or cell. The scheduling entity may be responsible for scheduling, assigning, reconfiguring, and releasing resources for one or more subordinate entities. That is, for scheduled communication, subordinate entities can utilize resources allocated by one or more scheduling entities.

BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

Turning back to FIG. 1, this figure illustrates a variety of potential deployments for various deployment scenarios. For example, in FIG. 1, a solid line with double arrows indicates desired transmissions between a UE and a serving BS, which is a BS designated to serve the UE on the downlink (DL) and/or uplink (UL). A finely dashed line with double arrows indicates interfering transmissions between a UE and a BS. Other lines show component to component (e.g., UE to UE) communication options.

Figure 2:
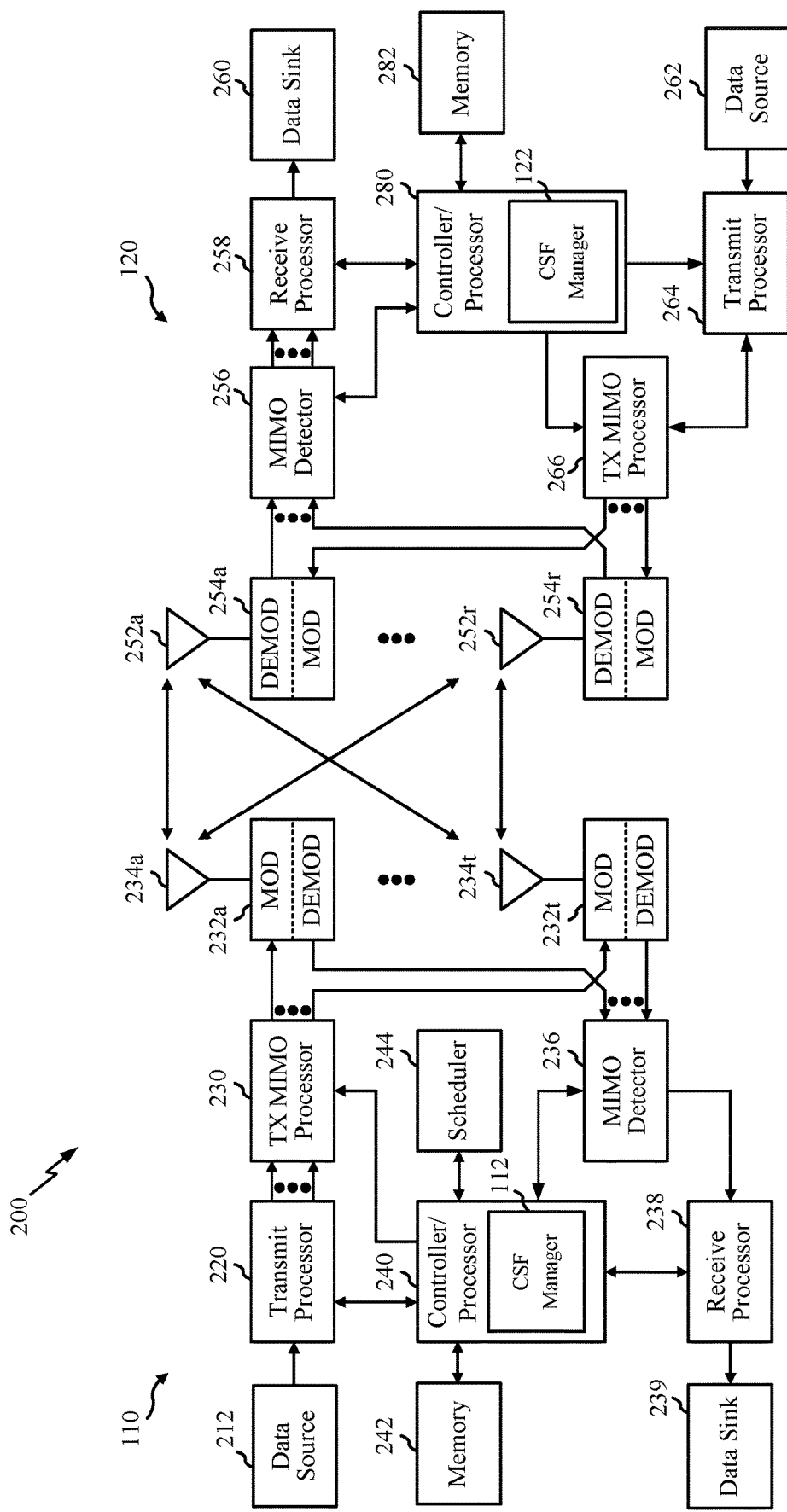
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1) which may be used to implement aspects of the present disclosure. For example, antennas 252, processors 266, 258, 264, and/or controller/processor 280, which includes CSF Manager 122, of UE 120 may be used to perform operations 400 of FIG. 4, while antennas 234, processors 220, 230, 238, and/or controller/processor 240, which includes CSF Manager 112, of BS 110 may be used to perform operations 500 of FIG. 5.

At BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. Processor 220 may process (e.g., encode and symbol map) the data and control information to obtain data symbols and control symbols, respectively. Processor 220 may also generate reference symbols, e.g., for the primary synchronization signal (PSS), secondary synchronization signal (SSS), and cell-specific reference signal (CRS). A transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators in transceivers 232a-232t may be transmitted via the antennas 234a-234t, respectively.

At UE 120, antennas 252a-252r may receive DL signals from BS 110 and may provide received signals to demodulators (DEMODs) in transceivers 254a-254r, respectively. Each demodulator in transceivers 254a-254r may condition (e.g., filter, amplify, down convert, and digitize) a respective received signal to obtain input samples. Each demodulator may further process input samples (e.g., for OFDM, etc.) to obtain received symbols. A MIMO detector 256 may obtain received symbols from all demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the UL, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110. At the BS 110, UL signals from UE 120 may be received by the antennas 234, processed by the modulators in transceivers 232, detected by a MIMO detector 236 if applicable, and further processed by a receive processor 238 to obtain decoded data and control information sent by the UE 120. Receive processor 238 may provide the decoded data to a data sink 239 and the decoded control information to controller/processor 240.

Controllers/processors 240 and 280 may direct operations at BS 110 and UE 120, respectively. Processor 240 and/or other processors and modules at BS 110 may perform or direct execution of processes for techniques described herein. Memories 242 and 282 may store data and program codes for BS 110 and UE 120, respectively. A scheduler 244 may schedule UEs for data transmission on the DL and/or UL.

Figure 3:
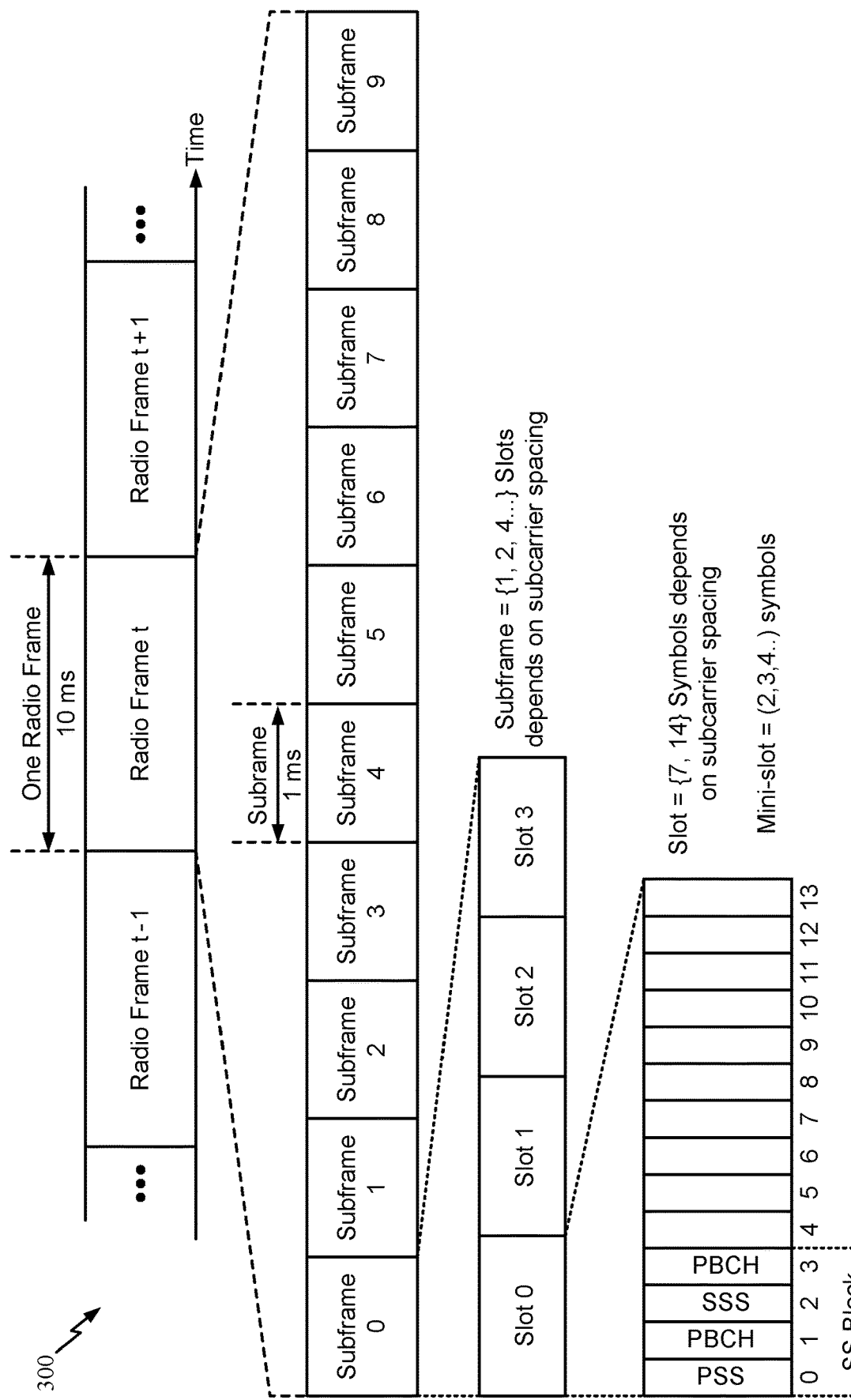
FIG. 3 illustrates an example of a frame format for a new radio (NR) system, in accordance with certain aspects of the present disclosure.

FIG. 3 illustrates an example of a frame format 300 for a new radio (NR) system, in accordance with certain aspects of the present disclosure. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing (SCS). Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as DL system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

A control resource set (CORESET) for systems, such as an NR and LTE systems, may comprise one or more control resource (e.g., time and frequency resources) sets, configured for conveying PDCCH, within the system bandwidth. Within each CORESET, one or more search spaces (e.g., common search space (CSS), UE-specific search space (USS), etc.) may be defined for a given UE. According to aspects of the present disclosure, a CORESET is a set of time and frequency domain resources, defined in units of resource element groups (REGs). Each REG may comprise a fixed number (e.g., twelve) tones in one symbol period (e.g., a symbol period of a slot), where one tone in one symbol period is referred to as a resource element (RE). A fixed number of REGs may be included in a control channel element (CCE). Sets of CCEs may be used to transmit new radio PDCCHs (NR-PDCCHs), with different numbers of CCEs in the sets used to transmit NR-PDCCHs using differing aggregation levels. Multiple sets of CCEs may be defined as search spaces for UEs, and thus a NodeB or other base station may transmit an NR-PDCCH to a UE by transmitting the NR-PDCCH in a set of CCEs that is defined as a decoding candidate within a search space for the UE, and the UE may receive the NR-PDCCH by searching in search spaces for the UE and decoding the NR-PDCCH transmitted by the NodeB.

Example Dynamic Triggering and Skipping of Channel State Feedback (CSF)

Certain aspects of the present disclosure provide techniques for dynamically triggering or skipping channel state feedback (CSF). These techniques may help conserve resources by transmitting channel state information (CSI) reports only in some reporting occasions, and skipping transmission in other reporting occasions (e.g., when the CSF may be "stale" in scenarios with rapidly changing channel conditions).

New Radio (NR) 3GPP Release 15 and 16 support two CSI reporting mechanisms: periodic CSI (P-CSI) reports transmitted on the physical uplink control channel (PUCCH) and semi-persistent CSI (SP-CSI) reports transmitted on the PUCCH. P-CSI reporting is used to periodically report channel quality of a downlink (DL) channel at the UE. Parameters such as periodicity and subframe offset are configured by a serving cell using higher layer signaling (e.g., radio resource control (RRC) signaling). Similar to P-CSI reporting, SP-CSI reporting has a periodicity and subframe offset which may be configured by the serving cell. However, a dynamic trigger may be used to signal a UE to begin periodically reporting CSI. In some cases, a dynamic trigger may also be used to signal the UE to stop the SP transmission of CSI reports. For example, a medium access control (MAC) control element (CE) may be used as a dynamic trigger to activate/deactivate SP-CSI reporting occasions.

NR 3GPP Release 17 supports various wireless communication services, such as ultra-reliable low-latency communications (URLLC). URLLC generally refers to a set of features that provide low latency and ultra-high reliability for mission critical applications such as industrial internet, smart grids, remote surgery and intelligent transportation systems. Thus, given the low latency and reliability requirements of URLLC, aperiodic CSI (A-CSI) reporting has been considered for NR 3GPP Release 17. This type of CSI reporting involves a one-time CSI report by the UE which is dynamically triggered by a network entity, e.g. by downlink control information (DCI) in the physical downlink control channel (PDCCH). Some of the parameters related to the configuration of the aperiodic CSI report are semi-statically configured from the network entity to the UL but the triggering is dynamic. While A-CSI reporting is advantageous in that it has low latency (e.g., is faster), and it only needs to be triggered when there is DL data/communication, A-CSI reporting also has its drawbacks. For example, A-CSI reporting may increase overhead due to DCI (i.e., a DL grant is required to trigger A-CSI reports on PUCCH), and in some cases, require complicated procedures be defined on top of the existing CSI reporting.

Aspects of the present disclosure provide techniques that may help clarify triggering and skipping of CSI-reporting when CSF reporting occasions comprise P-CSI or SP-CSI reporting occasions. As such, the techniques may help a UE conserve power and make efficient use of resources. The techniques may also help a BS (e.g., a gNB) know when to expect a CSF report.

According to certain aspects, when using P/SP-CSI report resources, the UE may only transmit the P/SP-CSI report when the UE receives a DL grant via a PDCCH or DL data via a semi-persistent scheduled (SPS) physical downlink shared channel (PDSCH) without PDCCH. Accordingly, because P/SP-CSI report resources may not always be transmitted in configured P-CSI or SP-CSI reporting occasions, a network entity may configure the CSI report to be transmitted with relatively small periodicity (e.g., as compared to conventional P/SP-CSI reports). Thus, the techniques presented herein provide a good tradeoff between CSI reporting latency and triggering overhead.

FIG. 4 is a flow diagram illustrating example operations 400 for wireless communication by a UE, in accordance with certain aspects of the present disclosure. Operations 400 may be performed, for example, by UE 120a in wireless communication network 100. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 400 begin, at 405, by the UE receiving, from a network entity, a configuration indicating CSF reporting occasions. For example, the UE may receive a configuration for the UE to provide CSI reports via P-CSI or SP-CSI reporting schemes.

At 410, the UE receives a DL transmission. For example, the UE may receive a DCI triggering a report. At 415, the UE transmits CSF on only some CSF reporting occasions after receiving the DL transmission when one or more trigger conditions are met. According to certain aspects, when one or more trigger conditions are not met, the UE skips at least some CSF reporting occasions (e.g., does not transmit CSF in at least some CSF reporting occasions). As will be described in greater detail below, the DCI may trigger a report based on certain channel state information-reference signal (CSI-RS), and the UE may or may not send the report in a subsequent reporting occasion (e.g., configured via the configuration received at block 405).

FIG. 5 is a flow diagram illustrating example operations 500 for wireless communication by a network entity, in accordance with certain aspects of the present disclosure. Operations 500 may be performed, for example, by BS 110a in wireless communication network 100. Operations 500 may be complementary operations by the network entity to operations 400 performed by the UE. Operations 500 may be implemented as software components that are executed and run on one or more processors (e.g., controller/processor 240 of FIG. 2). Further, the transmission and reception of signals by the network entity in operations 500 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals.

Operations 500 begin, at 505, by the network entity transmitting, to a UE, a configuration indicating CSF reporting occasions. At 510, the network entity transmits a DL transmission to the UE. At 515, the network entity receives CSF from the UE on only some CSF reporting occasions after transmitting the DL transmission when one or more trigger conditions are met.

Operations 400 and 500 of FIGS. 4 and 5 may be understood with reference to diagrams 600, 700, 800, 900, and 1000 of FIGS. 6, 7, 8, 9, and 10, respectively, that show example dynamic triggering and skipping of CSF, in accordance with certain aspects of the present disclosure.

FIG. 6 illustrates example dynamic triggering of CSF, in accordance with certain aspects of the present disclosure. As shown in FIG. 6, where higher layer signaling (e.g., RRC signaling) configures one or more occasions as SP-CSI report occasions, a dynamic trigger may be needed to enable a UE to periodically report CSI. However, after receiving such a trigger (e.g., a MAC-CE activating SP-CSI reporting), a UE may skip transmission of CSF in activated slots where no DL data is received. Rather, one or more SP-CSI reports may be triggered in activated slots where a DL transmission is received from a network entity. According to certain aspects, the DL transmission may be a DL grant (e.g., a DL grant associated with a high priority) or a semi-persistent scheduled (SPS) PDSCH (e.g., an SPS PDSCH without PDCCH associated with a high priority). As shown in FIG. 6, following receipt of the DL assignment (e.g., associated with a high priority), a UE may be triggered to transmit CSF (e.g., CSI report(s)) in both a first SP-CSI reporting occasion (N=1) and a second SP-CSI reporting occasion (N=2) (e.g., where N is an integer greater than 0 and $N_{max}=2$).

While FIG. 6 illustrates dynamic triggering of CSF when CSF reporting occasions comprise SP-CSI reporting occasions activated via MAC-CE signaling, other embodiments may include dynamic triggering of CSF when CSF reporting occasions comprise P-CSI reporting occasions. In such embodiments, CSI reporting occasions may be activated without the need for MAC-CE. However, P-CSI reporting may not be triggered in a P-CSI reporting occasion unless a DL transmission (e.g., a DL grant or a SPS PDSCH) is received in a slot.

Various options, as shown in diagrams 700, 800, 900, and 1000 of FIGS. 7, 8, 9, and 10, respectively, may be considered for determining a slot for transmission of a CSI report when reporting is triggered by the receipt of a DL transmission. More specifically, one or more trigger conditions may involve relative timing between a CSF reporting occasion on which CSF is transmitted and a timing of the DL grant or SPS PDSCH, a measurement resource on which the transmitted CSF is based, or both.

Figure 7:
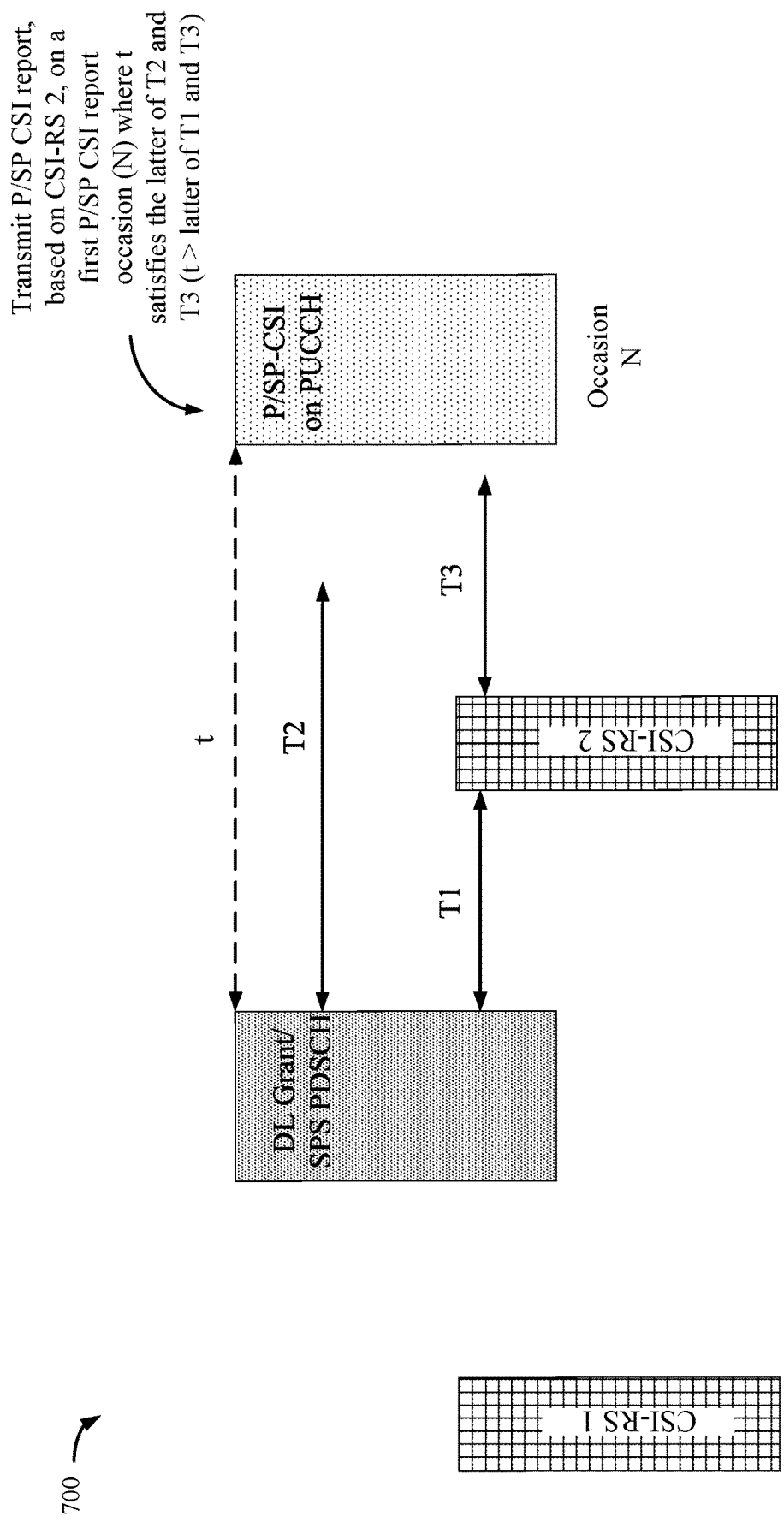
FIG. 7 illustrates an example timeline for transmitting CSF on only some CSF reporting occasions after receipt of a downlink (DL) transmission by a UE, in accordance with certain aspects of the present disclosure.

FIG. 7 illustrates an example timeline 700 for transmitting CSF on only some CSF reporting occasions after receipt of a downlink (DL) transmission by a UE, in accordance with certain aspects of the present disclosure.

According to a first option, a UE may perform channel and/or interference measurement using a first P/SP-CSI reference signal (P/SP-CSI-RS)/interference measurement (IM) resource that is at least a first threshold time, T1, after receiving the DL grant or SPS PDSCH (shown as CSI-RS 2 in FIG. 7). In some examples, as also shown in the example of FIG. 7, the UE may be triggered to transmit a P/SP-CSI report, based on CSI-RS 2, on a first P/SP-CSI report occasion (N) that occurs at a time t that occurs at least a threshold time, T2, after receiving the DL grant/SPS PDSCH (e.g., t>T2) and at least a threshold time, T3, after the measurement resource, CSI-RS 2 (e.g., t>T3). In other words, the UE may be triggered to transmit a P/SP-CSI report, based on CSI-RS 2, on a first P/SP-CSI report occasion (N) that has a time t>T2 and T3.

In some examples not shown in FIG. 7, the UE may be triggered to transmit a P/SP-CSI report, based on CSI-RS 2, on a first P/SP-CSI report occasion (N) that occurs at least a time t that only satisfies T2 (e.g., t>T2) (irrespective of time t relative to T3). In some other examples not shown in FIG. 7, the UE may be triggered to transmit a P/SP-CSI report, based on CSI-RS 2, on a first P/SP-CSI report occasion (N) that occurs at least a time t that only satisfies T3 (e.g., t>T3) (irrespective of time t relative to T2).

Figure 8A:
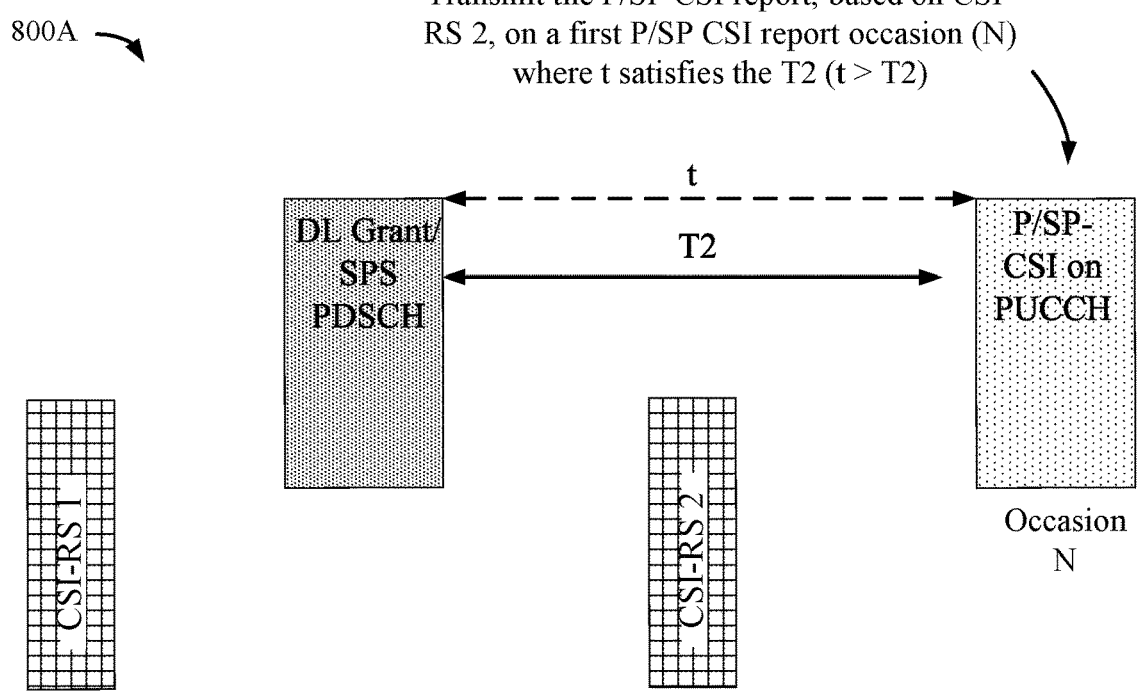
FIGS. 8A and 8B illustrate other example timelines for transmitting CSF on only some CSF reporting occasions after receipt of a DL transmission by a UE, in accordance with certain aspects of the present disclosure.
Figure 8B:
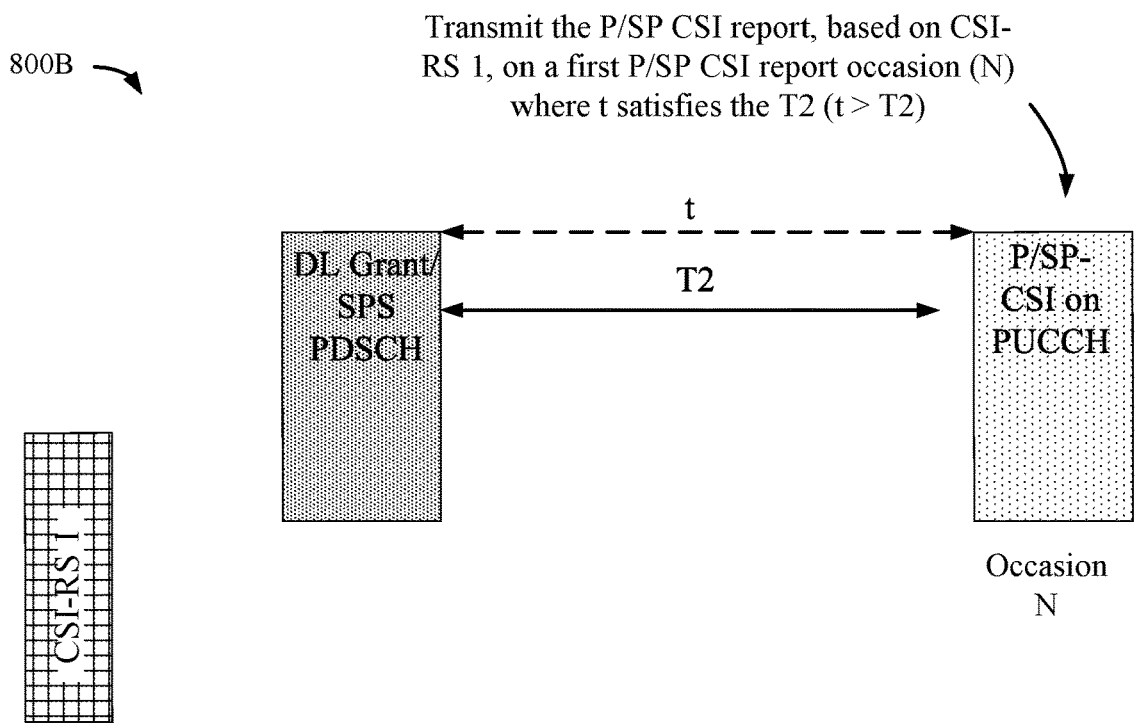

FIGS. 8A and 8B illustrate other example timelines 800A and 800B, respectively, for transmitting CSF on only some CSF reporting occasions after receipt of a DL transmission by a UE, in accordance with certain aspects of the present disclosure. According to a second option, a UE may generate CSF (i.e., perform channel and/or interference measurement) based on a most recent measurement resource satisfying a processing time constraint. In other words, as shown in FIGS. 8A and 8B, the UE may generate CSF based on a CSI-RS/IM occurring after receipt of the DL grant/SPS PDSCH (e.g., CSI-RS 2 in FIG. 8A) or on a CSI-RS/IM occurring prior to receiving the DL grant/SPS PDSCH (e.g., CSI-RS 1 in FIG. 8B).

Generating CSF based on CSI-RS/IM resource occurring before the DL grant/SPS PDSCH essentially requires the UE to always monitor for the measurement resource. Following generation of the P/SP-CSI report, the UE may be triggered to transmit the report, based on the most recent measurement resource, on a first P/SP-CSI report occasion (N) that occurs (at time t) at least the threshold time, T2, after receiving the DL grant/SPS PDSCH (e.g., t>T2).

Figure 9:
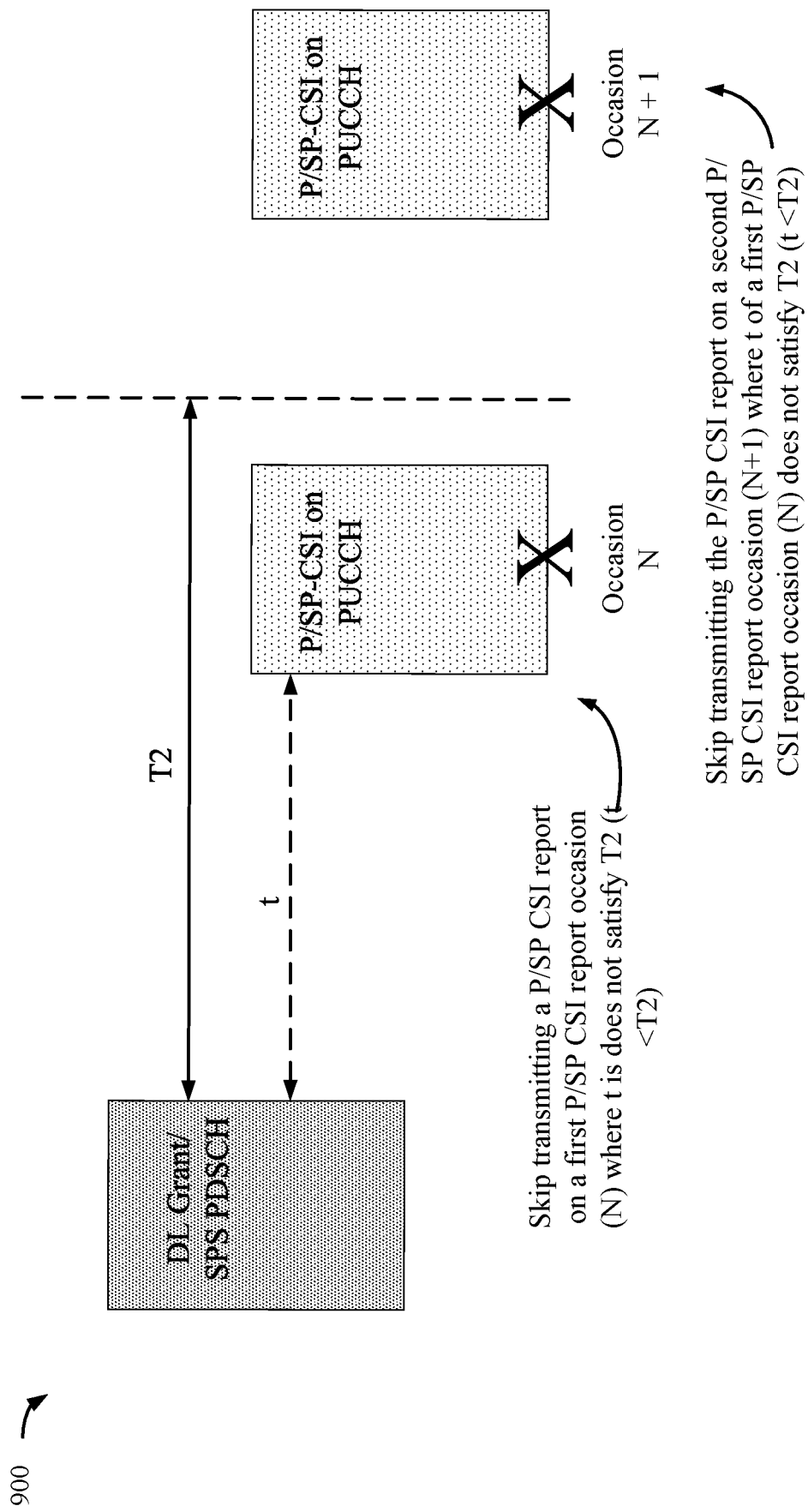
FIG. 9 illustrates another example timeline for transmitting CSF on only some CSF reporting occasions after receipt of a DL transmission by a UE, in accordance with certain aspects of the present disclosure.

FIG. 9 illustrates another example timeline 900 for transmitting CSF on only some CSF reporting occasions after receipt of a DL transmission by a UE, in accordance with certain aspects of the present disclosure. According to a third option, a UE may be configured to transmit CSF only when a time t of the first reporting occasion after the DL grant or SPS PDSCH occurs at least the threshold time, T2, after the DL grant or SPS PDSCH. In the illustrated example timeline 900, a first P/SP-CSI reporting occasion (N) occurring at a time t does not satisfy the threshold time T2 measured from the DL grant/SPS PDSCH (e.g., t<T2). Accordingly, a UE may skip transmitting a P/SP-CSI report on the first P/SP-CSI report occasion (N). Further, the UE may also not transmit the P/SP-CSI report in a subsequent reporting occasion (N+1) that satisfies the threshold time T2. In other words, where the first reporting occasion (N) does not satisfy the T2 threshold, then the UE may skip transmission in the first reporting occasion (N) and any subsequent reporting occasion (e.g., N+1) as the CSI report may be considered too late (e.g., due to a high mobility or other scenario with rapidly changing channel conditions).

Figure 10:
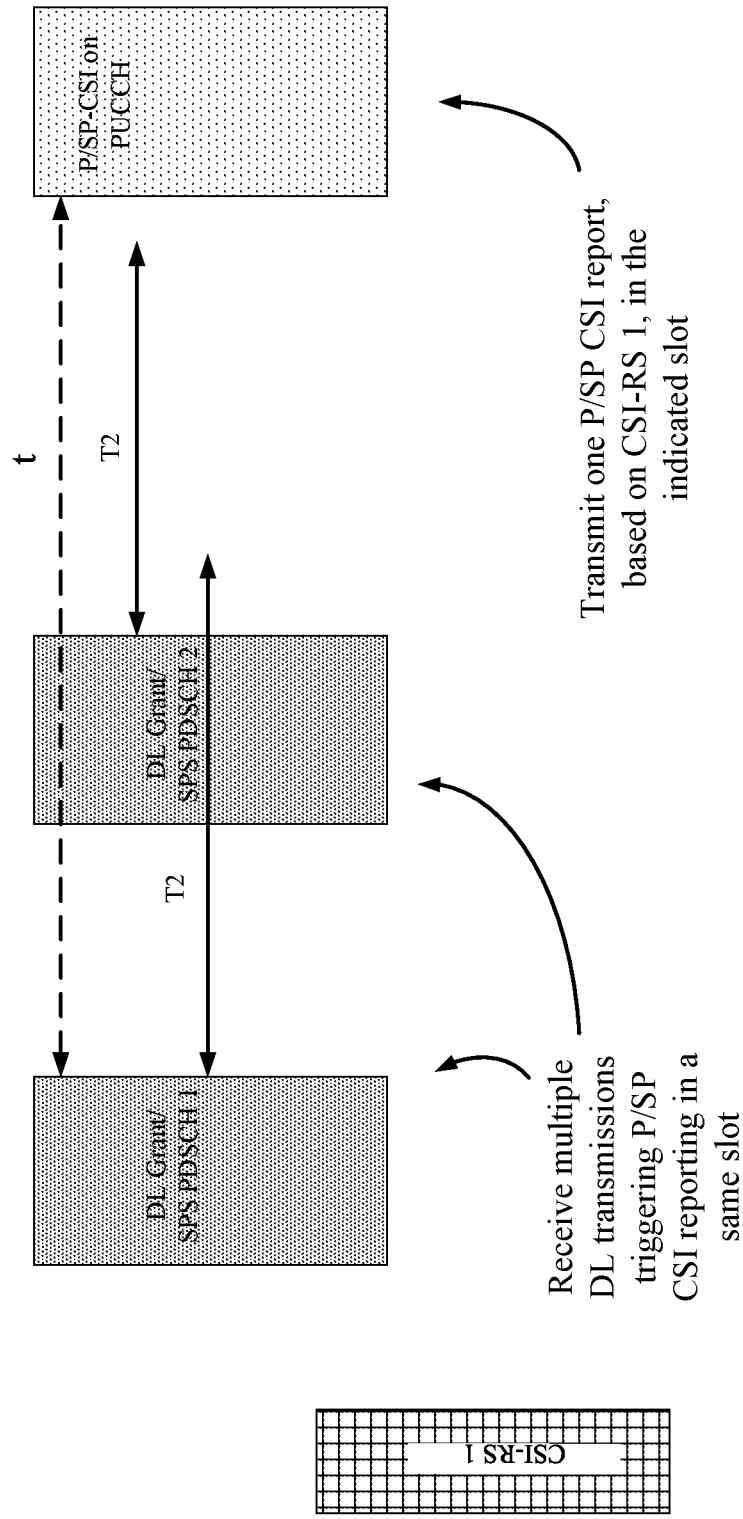
FIG. 10 illustrates an example timeline for transmitting CSF on only some CSF reporting occasions after receipt of multiple DL transmission by a UE, in accordance with certain aspects of the present disclosure.

According to certain aspects, when a UE may receive multiple DL grants or SPS PDSCHs triggering CSF in a same slot, the UE may only send one report. FIG. 10 illustrates an example timeline 1000 for transmitting CSF on only some CSF reporting occasions after receipt of multiple DL transmission by a UE, in accordance with certain aspects of the present disclosure. With respect to the first, second, and third option described herein, where a UE receives multiple DL grants or SPS PDSCHS triggering CSI reporting in a same slot, the UE may transmit only one P/SP-CSI report in that slot.

As shown in FIG. 10, with respect to the second option, the UE may receive a first DL transmission (e.g., DL grant/SPS PDSCH 1) and a second DL transmission (e.g., DL grant/SPS PDSCH 2) triggering CSF in a same slot. In response, the UE may transmit one P/SP-CSI report, based on CSI-RS 1 in this example, in the indicated slot (e.g., the P/SP-CSI reporting occasion that satisfies T2). Multiple DL transmission triggers may be satisfied by the transmission of a single P/SP-CSI report.

According to certain aspects, a UE may receive multiple DL grants or SPS PDSCHs triggering CSI reporting in different slots. For example, the UE may receive a first DL transmission triggering a first CSF in a first slot and subsequently receive a second DL transmission triggering a second CSF in a second slot. Where the first slot for the CSF transmission occurs before the second slot for CSF transmission but after the second DL transmission, the UE may transmit the first CSF and determine not to transmit the second CSF because the first CSF is transmitted after the second DL transmission and may be considered to be up to date.

According to a fourth option, instead of using configured P/SP-CSI report occasions, a UE may be triggered to transmit CSF on a CSF reporting occasion that occurs a fixed offset after the DL grant or SPS PDSCH (e.g., in a slot occurring a fixed offset after the DL grant or SPS PDSCH may be considered a configured report occasion).

According to certain aspects, transmitting CSF on only some CSF reporting occasions after receiving the DL transmission may occur only when the DL transmission (e.g., DL grant or SPS PDSCH) is of a given priority. For example, transmitting the (enhanced) P/SP-CSI may only be triggered by a DL grant or SPS PDSCH associated with a high priority. As such, this P/SP-CSI report may be treated as a high priority CSI report. In certain aspects, transmitting CSF on only some CSF reporting occasions after receiving the DL transmission may occur only when the DL transmission (e.g., DL grant or SPS PDSCH) is of a priority higher than or equal to a priority threshold. For example, transmitting CSF on only some CSF reporting occasions after receiving the DL transmission may occur when the DL transmission is of a priority of four where the priority threshold is a priority of three.

According to certain aspects, a UE may receive signaling indicating whether the UE can skip CSF reporting occasions when the one or more trigger conditions are not met. In some cases where the CSF reporting occasions are P-CSI reporting occasions, RRC signaling may indicate whether the UE can skip CSF reporting occasions when the one or more trigger conditions are not met. In some cases where the CSF reporting occasions are SP-CSI reporting occasions activated via MAC-CE, the MAC-CE may indicate whether the UE can skip CSF reporting occasions when the one or more trigger conditions are not met. For example, the MAC-CE may be an enhanced MAC-CE indicating that SP-CSI occasions may be skipped when no data is received by the UE.

According to certain aspects, transmitting CSF on only some CSF reporting occasions after receiving the DL transmission may occur only when the DL transmission is a PDCCH associated with a particular control resource set (CORESET)/search space or has a particular downlink control information (DCI) format (e.g., DCI 1_2).

According to certain aspects, transmitting CSF on only some CSF reporting occasions after receiving the DL transmission may occur only when one or more fields of the DL transmission indicate a particular code point. For example, one or more other fields beyond the priority field in DCI, including a field with a hybrid automatic repeat request (HARM) process number, a field with a modulation and coding scheme (MCS), and a field with a physical uplink control channel (PUCCH) resource indicator, may be used to trigger the CSF.

Example Wireless Communications Devices

Figure 11:
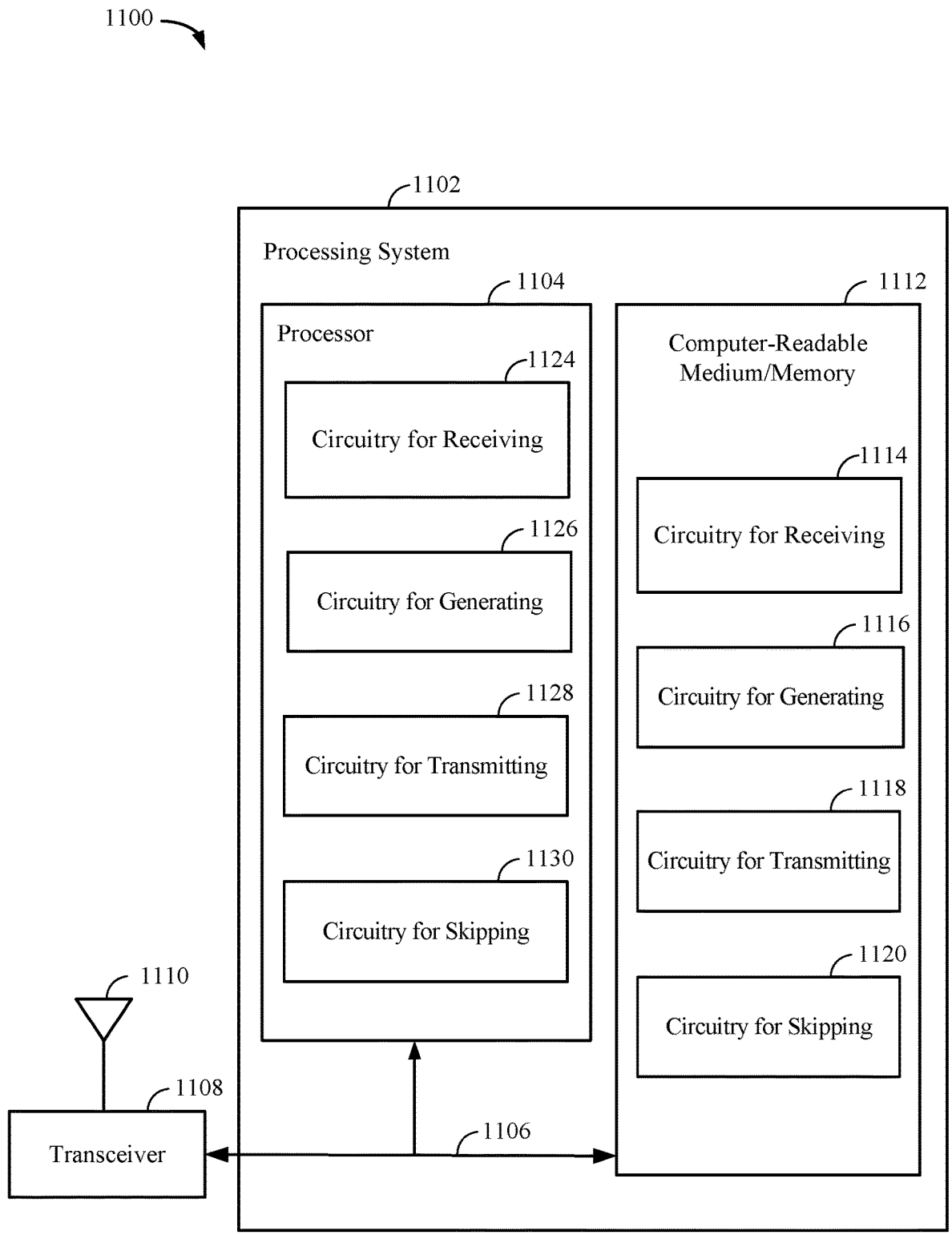
FIG. 11 illustrates a communications device that may include various components configured to perform operations for the techniques disclosed herein, in accordance with aspects of the present disclosure.

FIG. 11 illustrates a communications device 1100 that may include various components (e.g., corresponding to means-plus-function components) configured to perform operations for the techniques disclosed herein, such as operations 400 illustrated in FIG. 4. In some examples, communications device 1100 may be a user equipment (UE), such as UE 120 as described, for example with respect to FIGS. 1 and 2.

Communications device 1100 includes a processing system 1102 coupled to a transceiver 1108 (e.g., a transmitter and/or a receiver). Transceiver 1108 is configured to transmit and receive signals for communications device 1100 via an antenna 1110, such as the various signals as described herein. Processing system 1102 may be configured to perform processing functions for communications device 1100, including processing signals received and/or to be transmitted by communications device 1100.

Processing system 1102 includes a processor 1104 coupled to a computer-readable medium/memory 1112 via a bus 1106. In certain aspects, computer-readable medium/memory 1112 is configured to store instructions (e.g., computer-executable code) that when executed by processor 1104, cause processor 1104 to perform operations 400 illustrated in FIG. 4, or other operations for performing the various techniques discussed herein for dynamically triggering or skipping channel state information (CSI) reporting. In certain aspects, computer-readable medium/memory 1112 stores code 1114 for receiving (e.g., for receiving, from a network entity, a configuration indicating channel state feedback (CSF) reporting occasions and/or for receiving a downlink (DL) transmission); code 1116 for generating (e.g., for generating the CSF based on a most recent measurement resource satisfying a processing time constraint); code 1118 for transmitting (e.g., for transmitting CSF on only some CSF reporting occasions after receiving the DL transmission when one or more trigger conditions are met); and code 1120 for skipping (e.g., for skipping at least some CSF reporting occasions when one or more trigger conditions are not met); etc.

Examples of a computer-readable medium/memory 1112 include random access memory (RAM), read-only memory (ROM), solid state memory, a hard drive, a hard disk drive, etc. In some examples, computer-readable medium/memory 1112 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In certain aspects, processor 1104 has circuitry configured to implement the code stored in computer-readable medium/memory 1112. Processor 1104 includes circuitry 1124 for receiving (e.g., for receiving, from a network entity, a configuration indicating CSF reporting occasions and/or for receiving a DL transmission); circuitry 1126 for generating (e.g., for generating the CSF based on a most recent measurement resource satisfying a processing time constraint); circuitry 1128 for transmitting (e.g., for transmitting CSF on only some CSF reporting occasions after receiving the DL transmission when one or more trigger conditions are met);

circuitry 1130 for skipping (e.g., for skipping at least some CSF reporting occasions when one or more trigger conditions are not met); etc.

Various components of communications device 1100 may provide means for performing the methods described herein, including with respect to FIG. 4.

In some examples, means for transmitting or sending (or means for outputting for transmission) may include transceivers 254 and/or antenna(s) 252 of UE 120 illustrated in FIG. 2 and/or transceiver 1108 and antenna 1110 of communications device 1100 illustrated in FIG. 11.

In some examples, means for communicating or receiving (or means for obtaining) may include the transceivers 254 and/or antenna(s) 252 of UE 120 illustrated in FIG. 2 and/or transceiver 1108 and antenna 1110 of communications device 1100 illustrated in FIG. 11.

In some examples, means for generating and means for skipping may include various processing system 1102 components, such as: the one or more processors 1104 in FIG. 11, or aspects of UE 120 depicted in FIG. 2, including receive processor 258, transmit processor 264, TX MIMO processor 266, and/or controller/processor 280.

Notably, FIG. 11 is just one use example, and many other examples and configurations of communications device 1100 are possible.

Figure 12:
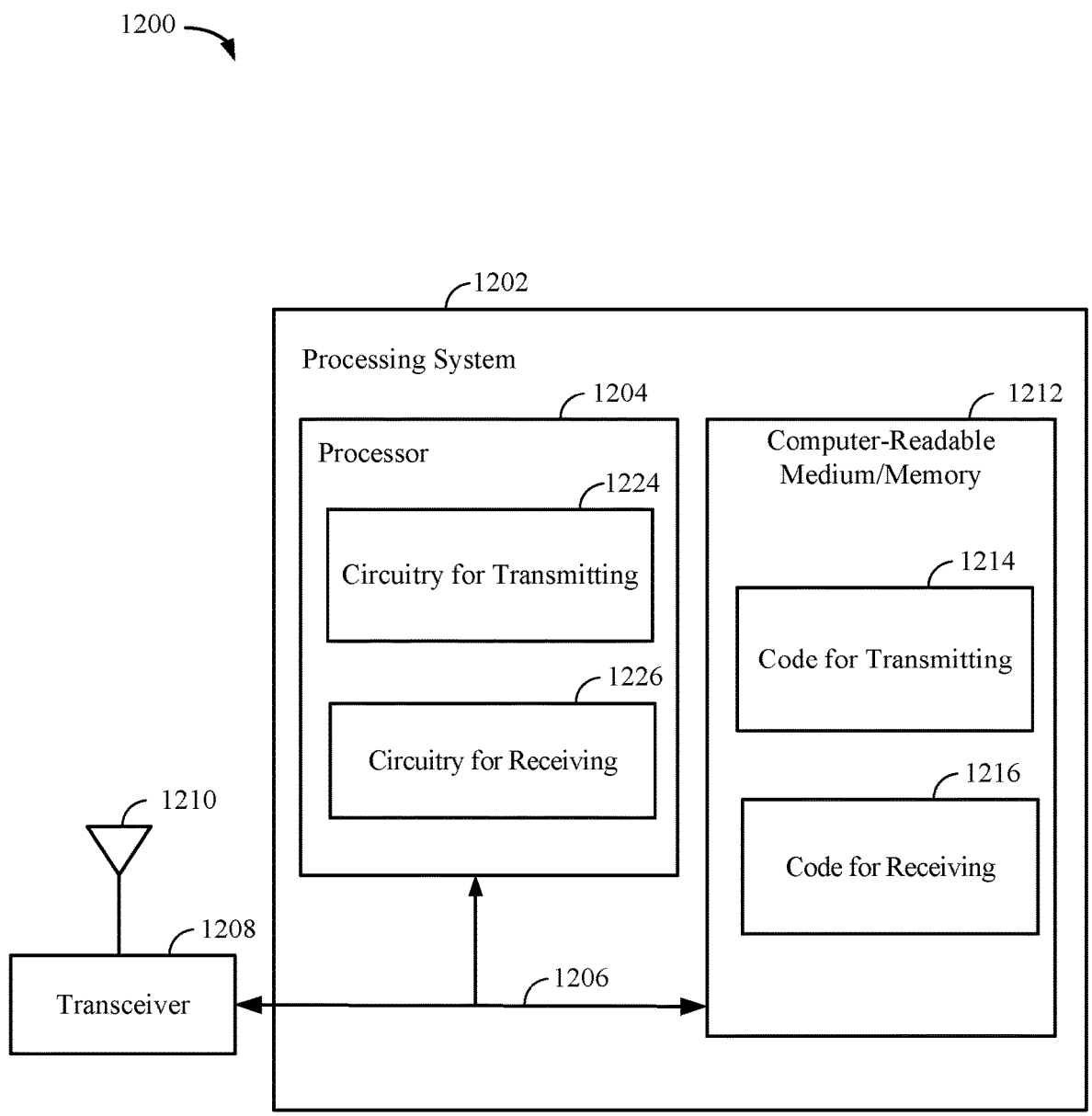
FIG. 12 illustrates a communications device that may include various components configured to perform operations for the techniques disclosed herein, in accordance with aspects of the present disclosure.

FIG. 12 illustrates a communications device 1200 that may include various components (e.g., corresponding to means-plus-function components) configured to perform operations for the techniques disclosed herein, such as operations 500 illustrated in FIG. 5. In some examples, communications device 1200 may be a network entity, such as base station (BS) 110 as described, for example with respect to FIGS. 1 and 2.

Communications device 1200 includes a processing system 1202 coupled to a transceiver 1208 (e.g., a transmitter and/or a receiver). Transceiver 1208 is configured to transmit and receive signals for communications device 1200 via an antenna 1210, such as the various signals as described herein. Processing system 1202 may be configured to perform processing functions for communications device 1200, including processing signals received and/or to be transmitted by communications device 1200.

Processing system 1202 includes a processor 1204 coupled to a computer-readable medium/memory 1212 via a bus 1206. In certain aspects, computer-readable medium/memory 1212 is configured to store instructions (e.g., computer-executable code) that when executed by processor 1204, cause processor 1204 to perform the operations illustrated in FIG. 5, or other operations for performing the various techniques discussed herein for dynamically triggering or skipping CSI reporting.

In certain aspects, computer-readable medium/memory 1212 stores code 1214 for transmitting (e.g., for transmitting, to a UE, a configuration indicating CSF reporting occasions and/or for transmitting a DL transmission to the UE); code 1216 for receiving (e.g., for receiving CSF from the UE on only some CSF reporting occasions after transmitting the DL transmission when one or more trigger conditions are met); etc.

Examples of a computer-readable medium/memory 1212 include RAM, ROM, solid state memory, a hard drive, a hard disk drive, etc. In some examples, computer-readable medium/memory 1212 is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In certain aspects, processor 1204 has circuitry configured to implement the code stored in the computer-readable medium/memory 1212. Processor 1204 includes circuitry 1224 for transmitting (e.g., for transmitting, to a UE, a configuration indicating CSF reporting occasions and/or for transmitting a DL transmission to the UE); circuitry 1226 for receiving (e.g., for receiving CSF from the UE on only some CSF reporting occasions after transmitting the DL transmission when one or more trigger conditions are met); etc.

Various components of communications device 1200 may provide means for performing the methods described herein, including with respect to FIG. 5.

In some examples, means for transmitting or sending (or means for outputting for transmission) may include transceivers 232 and/or antenna(s) 234 of BS 110 illustrated in FIG. 2 and/or transceiver 1208 and antenna 1210 of communications device 1200 illustrated in FIG. 12.

In some examples, means for communicating or receiving (or means for obtaining) may include the transceivers 232 and/or antenna(s) 234 of BS 110 illustrated in FIG. 2 and/or transceiver 1208 and antenna 1210 of communications device 1200 illustrated in FIG. 12.

Notably, FIG. 12 is just one use example, and many other examples and configurations of communications device 1200 are possible.

EXAMPLE ASPECTS

Aspect 1: A method for wireless communication by a user equipment (UE), comprising: receiving, from a network entity, a configuration indicating channel state feedback (CSF) reporting occasions; receiving a downlink (DL) transmission; and transmitting CSF on only some CSF reporting occasions after receiving the DL transmission when one or more trigger conditions are met.

Aspect 2: The method of Aspect 1, further comprising skipping at least some CSF reporting occasions when one or more trigger conditions are not met.

Aspect 3: The method of Aspect 1 or 2, wherein the CSF reporting occasions comprise periodic channel state information (P-CSI) reporting occasions.

Aspect 4: The method of any of Aspects 1-3, wherein the CSF reporting occasions comprise semi-persistent channel state information (SP-CSI) reporting occasions activated via medium access control (MAC) control element (CE) signaling.

Aspect 5: The method of any of Aspects 1-4, wherein the DL transmission comprises at least one of a DL grant or semi-persistent scheduled (SPS) physical downlink shared channel (PDSCH).

Aspect 6: The method of any of Aspects 1-5, wherein the one or more trigger conditions involve relative timing between a CSF reporting occasion on which CSF is transmitted and at least one of: a DL grant or semi-persistent scheduled (SPS) physical downlink shared channel (PDSCH); or a measurement resource on which the transmitted CSF is based.

Aspect 7: The method of Aspect 6, wherein: the measurement resource occurs at least a first threshold after the grant or SPS PDSCH; and the CSF reporting occasion on which CSF is transmitted occurs at least at least one of a second threshold after the grant or SPS PDSCH; or a third threshold after the measurement resource.

Aspect 8: The method of Aspect 6 or 7, wherein the CSF reporting occasion on which CSF is transmitted occurs at least a threshold after the grant or SPS PDSCH.

Aspect 9: The method of Aspect 8, wherein the UE generates the CSF based on a most recent measurement resource satisfying a processing time constraint.

Aspect 10: The method of Aspect 8 or 9, wherein the UE is configured to transmit CSF only when a first reporting occasion after the grant or SPS PDSCH occurs at least the threshold after the grant or SPS PDSCH.

Aspect 11: The method of any of Aspects 5-10, wherein the UE transmits CSF on a CSF reporting occasion that occurs a fixed offset after the grant or SPS PDSCH when the one or more trigger conditions are met.

Aspect 12: The method of any of Aspects 1-11, wherein, if the UE receives multiple DL transmissions triggering CSF reporting in a same slot, the UE transmits only one CSF report in that slot.

Aspect 13: The method of any of Aspects 1-12, wherein: if the UE receives a first DL transmission triggering a first CSF in a first slot and a second DL transmission triggering a second CSF in a second slot, wherein the first slot occurs before the second slot and after the second DL transmission, the UE transmits the first CSF but not the second CSF.

Aspect 14: The method of any of Aspects 1-13, wherein the one or more trigger conditions are met only when the DL transmission is of a priority higher than or equal to a priority threshold.

Aspect 15: The method of any of Aspects 1-14, further comprising receiving signaling indicating whether the UE can skip CSF reporting occasions when the one or more trigger conditions are not met.

Aspect 16: The method of Aspect 15, wherein: the CSF reporting occasions comprise periodic channel state information (P-CSI) reporting occasions; and the signaling comprises radio resource control (RRC) signaling.

Aspect 17: The method of Aspect 15 or 16, wherein: the CSF reporting occasions comprise semi-persistent channel state information (SP-CSI) reporting occasions activated via a medium access control (MAC) control element (CE); and the MAC CE indicates whether the UE can skip CSF reporting occasions when the one or more trigger conditions are not met.

Aspect 18: The method of any of Aspects 1-17, wherein the one or more trigger conditions are met only when the DL transmission comprises a physical downlink control channel (PDCCH) associated with a particular control resource set (CORESET) or has a particular downlink control information (DCI) format.

Aspect 19: The method of any of Aspects 1-18, wherein the one or more trigger conditions are met only when one or more fields of the DL transmission indicate a particular code point.

Aspect 20: A method for wireless communication by a network entity, comprising: transmitting, to a user equipment (UE), a configuration indicating channel state feedback (CSF) reporting occasions; transmitting a downlink (DL) transmission to the UE; and receiving CSF from the UE on only some CSF reporting occasions after transmitting the DL transmission when one or more trigger conditions are met.

Aspect 21: The method of Aspect 20, wherein the CSF reporting occasions comprise periodic channel state information (P-CSI) reporting occasions.

Aspect 22: The method of Aspect 20 or 21, wherein the CSF reporting occasions comprise semi-persistent channel state information (SP-CSI) reporting occasions activated via medium access control (MAC) control element (CE) signaling.

Aspect 23: The method of any of Aspects 20-22, wherein the DL transmission comprises at least one of a DL grant or semi-persistent scheduled (SPS) physical downlink shared channel (PDSCH).

Aspect 24: The method of any of Aspects 20-23, wherein the one or more trigger conditions involve relative timing between a CSF reporting occasion on which CSF is transmitted and at least one of: a DL grant or semi-persistent scheduled (SPS) physical downlink shared channel (PDSCH); or a measurement resource on which the transmitted CSF is based.

Aspect 25: The method of Aspect 24, wherein: the measurement resource occurs at least a first threshold after the grant or SPS PDSCH; and the CSF reporting occasion on which CSF is transmitted occurs at least at least one of: a second threshold after the grant or SPS PDSCH; or a third threshold after the measurement resource.

Aspect 26: The method of Aspect 24 or 25, wherein the CSF reporting occasion on which CSF is transmitted occurs at least a threshold after the grant or SPS PDSCH.

Aspect 27: The method of Aspect 26, wherein the UE generates the CSF based on a most recent measurement resource satisfying a processing time constraint.

Aspect 28: The method of Aspect 26 or 27, wherein the UE is configured to transmit CSF only when a first reporting occasion after the grant or SPS PDSCH occurs at least the threshold after the grant or SPS PDSCH.

Aspect 29: The method of any of Aspects 23-28, wherein the UE transmits CSF on a CSF reporting occasion that occurs a fixed offset after the grant or SPS PDSCH.

Aspect 30: The method of any of Aspects 20-29, wherein, if the network entity transmits multiple DL transmissions triggering CSF reporting in a same slot, the network entity receives only one CSF report in that slot from the UE.

Aspect 31: The method of any of Aspects 20-30, wherein, if the network entity transmits a first DL transmission triggering a first CSF in a first slot and a second DL transmission triggering a second CSF in a second slot, wherein the first slot occurs before the second slot and after the second DL transmission, the network entity receives only the first CSF but not the second CSF.

Aspect 32: The method of any of Aspects 20-31, wherein the one or more trigger conditions are met only when the DL transmission is of a given priority.

Aspect 33: The method of any of Aspects 20-32, further comprising transmitting to the UE signaling indicating whether the UE can skip CSF reporting occasions when the one or more trigger conditions are not met.

Aspect 34: The method of Aspect 33, wherein: the CSF reporting occasions comprise periodic channel state information (P-CSI) reporting occasions; and the signaling comprises radio resource control (RRC) signaling.

Aspect 35: The method of Aspect 33 or 34, wherein: the CSF reporting occasions comprise semi-persistent channel state information (SP-CSI) reporting occasions activated via a medium access control (MAC) control element (CE); and the MAC CE indicates whether the UE can skip CSF reporting occasions when the one or more trigger conditions are not met.

Aspect 36: The method of any of Aspects 20-35, wherein the one or more trigger conditions are met only when the DL transmission comprises a physical downlink control channel (PDCCH) associated with a particular control resource set (CORESET) or has a particular downlink control information (DCI) format.

Aspect 37: The method of any of Aspects 20-36, wherein the one or more trigger conditions are met only when one or more fields of the DL transmission indicate a particular code point.

Aspect 38: An apparatus, comprising a memory comprising computer-executable instructions and one or more processors configured to execute the computer-executable instructions and cause the one or more processors to perform a method in accordance with any one of Aspects 1-19.

Aspect 39: An apparatus, comprising means for performing a method in accordance with any one of Aspects 1-19.

Aspect 40: A non-transitory computer-readable medium comprising computer-executable instructions that, when executed by one or more processors, cause the one or more processors to perform a method in accordance with any one of Aspects 1-19.

Aspect 41: A computer program product embodied on a computer-readable storage medium comprising code for performing a method in accordance with any one of Aspects 1-19.

Aspect 42: An apparatus, comprising a memory comprising computer-executable instructions and one or more processors configured to execute the computer-executable instructions and cause the one or more processors to perform a method in accordance with any one of Aspects 20-37.

Aspect 43: An apparatus, comprising means for performing a method in accordance with any one of Aspects 20-37.

Aspect 44: A non-transitory computer-readable medium comprising computer-executable instructions that, when executed by one or more processors, cause the one or more processors to perform a method in accordance with any one of Aspects 20-37.

Aspect 45: A computer program product embodied on a computer-readable storage medium comprising code for performing a method in accordance with any one of Aspects 20-37.

ADDITIONAL CONSIDERATIONS

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 4 and 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A user equipment (UE) comprising:
 memory; and
 one or more processors coupled to the memory, the one or more processors being configured, individually or collectively, to cause the UE to:
  receive, from a network entity, a configuration indicating channel state feedback (CSF) reporting occasions;
  receive a downlink (DL) transmission; and
  transmit CSF on only some CSF reporting occasions after receiving the DL transmission when one or more trigger conditions are met, wherein the one or more trigger conditions involve relative timing between a CSF reporting occasion on which CSF is transmitted and at least one of:
   a DL grant or semi-persistent scheduled (SPS) physical downlink shared channel (PDSCH); or
   a measurement resource on which the transmitted CSF is based.

2. The UE of claim 1, wherein the one or more processors are further configured, individually or collectively, to cause the UE to:
 skip at least some CSF reporting occasions when the one or more trigger conditions are not met.

3. The UE of claim 1, wherein the CSF reporting occasions comprise periodic channel state information (P-CSI) reporting occasions.

4. The UE of claim 1, wherein the CSF reporting occasions comprise semi-persistent channel state information (SP-CSI) reporting occasions activated via medium access control (MAC) control element (CE) signaling.

5. The UE of claim 1, wherein the DL transmission comprises at least one of the DL grant or SPS PDSCH.

6. The UE of claim 1, wherein:
the measurement resource occurs at least a first threshold after the DL grant or SPS PDSCH; and
the CSF reporting occasion on which CSF is transmitted occurs at least one of:
a second threshold after the DL grant or SPS PDSCH; or
a third threshold after the measurement resource.

7. The UE of claim 1, wherein the CSF reporting occasion on which CSF is transmitted occurs at least a threshold after the DL grant or SPS PDSCH.

8. The UE of claim 7, wherein the one or more processors are further configured, individually or collectively, to cause the UE to:
generate the CSF based on a most recent measurement resource satisfying a processing time constraint.

9. The UE of claim 7, wherein the one or more processors being configured, individually or collectively, to cause the UE to transmit the CSF on only some CSF reporting occasions after receiving the DL transmission when the one or more trigger conditions are met comprises the one or more processors being configured, individually or collectively, to cause the UE to:
transmit CSF only when a first reporting occasion after the DL grant or SPS PDSCH occurs at least the threshold after the DL grant or SPS PDSCH.

10. The UE of claim 5, wherein the CSF is transmitted on a CSF reporting occasion that occurs a fixed offset after the DL grant or SPS PDSCH when the one or more trigger conditions are met.

11. The UE of claim 1, wherein the one or more processors being configured, individually or collectively, to cause the UE to transmit the CSF on only some CSF reporting occasions after receiving the DL transmission when the one or more trigger conditions are met comprises the one or more processors being configured, individually or collectively, to cause the UE to:
if the UE receives multiple DL transmissions triggering CSF reporting in a same slot, transmit only one CSF report in that slot.

12. The UE of claim 1, wherein the one or more processors being configured, individually or collectively, to cause the UE to transmit the CSF on only some CSF reporting occasions after receiving the DL transmission when the one or more trigger conditions are met comprises the memory and the one or more processors being configured, individually or collectively, to cause the UE to:
if the UE receives a first DL transmission triggering a first CSF in a first slot and a second DL transmission triggering a second CSF in a second slot, wherein the first slot occurs before the second slot and after the second DL transmission, transmit the first CSF but not the second CSF.

13. The UE of claim 1, wherein the one or more trigger conditions are met only when the DL transmission is of a priority higher than or equal to a priority threshold.

14. The UE of claim 1, wherein the one or more processors are further configured, individually or collectively, to cause the UE to:
receive signaling indicating whether the UE can skip CSF reporting occasions when the one or more trigger conditions are not met.

15. The UE of claim 14, wherein:
the CSF reporting occasions comprise periodic channel state information (P-CSI) reporting occasions; and
the signaling comprises radio resource control (RRC) signaling.

16. The UE of claim 14, wherein:
the CSF reporting occasions comprise semi-persistent channel state information (SP-CSI) reporting occasions activated via a medium access control (MAC) control element (CE); and
the MAC CE indicates whether the UE can skip CSF reporting occasions when the one or more trigger conditions are not met.

17. The UE of claim 1, wherein the one or more trigger conditions are met only when the DL transmission comprises a physical downlink control channel (PDCCH) associated with a particular control resource set (CORESET) or has a particular downlink control information (DCI) format.

18. The UE of claim 1, wherein the one or more trigger conditions are met only when one or more fields of the DL transmission indicate a particular code point.

19. A network entity comprising:
memory; and
one or more processors coupled to the memory, the one or more processors being configured, individually or collectively, to cause the network entity to:
transmit, to a user equipment (UE), a configuration indicating channel state feedback (CSF) reporting occasions;
transmit a downlink (DL) transmission to the UE; and
receive CSF from the UE on only some CSF reporting occasions after transmitting the DL transmission when one or more trigger conditions are met, wherein the one or more trigger conditions involve relative timing between a CSF reporting occasion on which CSF is received and at least one of:
a DL grant or semi-persistent scheduled (SPS) physical downlink shared channel (PDSCH); or
a measurement resource on which the received CSF is based.

20. The network entity of claim 19, wherein the CSF reporting occasions comprise periodic channel state information (P-CSI) reporting occasions.

21. The network entity of claim 19, wherein the CSF reporting occasions comprise semi-persistent channel state information (SP-CSI) reporting occasions activated via medium access control (MAC) control element (CE) signaling.

22. The network entity of claim 19, wherein the DL transmission comprises at least one of the DL grant or SPS PDSCH.

23. The network entity of claim 19, wherein:
the measurement resource occurs at least a first threshold after the DL grant or SPS PDSCH; and
the CSF reporting occasion on which CSF is transmitted occurs at least at least one of:
a second threshold after the DL grant or SPS PDSCH; or
a third threshold after the measurement resource.

24. The network entity of claim 19, wherein the CSF reporting occasion on which CSF is transmitted occurs at least a threshold after the DL grant or SPS PDSCH.

25. The network entity of claim 19, wherein when the one or more processors being configured, individually or collectively, to cause the network entity to transmit the DL transmission to the UE comprises the one or more processors being configured, individually or collectively, to cause the network entity to transmit multiple DL transmissions triggering CSF reporting in a same slot, the network entity receives only one CSF report in that slot from the UE.

26. The network entity of claim 19, wherein when the one or more processors being configured, individually or collectively, to cause the network entity to transmit the DL transmission to the UE comprises the one or more processors being configured, individually or collectively, to cause the network entity to transmit a first DL transmission triggering a first CSF in a first slot and a second DL transmission triggering a second CSF in a second slot, wherein the first slot occurs before the second slot and after the second DL transmission, the network entity receives only the first CSF but not the second CSF.

27. A method for wireless communication by a user equipment (UE), comprising:
receiving, from a network entity, a configuration indicating channel state feedback (CSF) reporting occasions;
receiving a downlink (DL) transmission; and
transmitting CSF on only some CSF reporting occasions after receiving the DL transmission when one or more trigger conditions are met, wherein the one or more trigger conditions involve relative timing between a CSF reporting occasion on which CSF is transmitted and at least one of:
a DL grant or semi-persistent scheduled (SPS) physical downlink shared channel (PDSCH); or
a measurement resource on which the transmitted CSF is based.

28. The method of claim 27, wherein:
the measurement resource occurs at least a first threshold after the DL grant or SPS PDSCH; and
the CSF reporting occasion on which CSF is transmitted occurs at least one of:
a second threshold after the DL grant or SPS PDSCH; or
a third threshold after the measurement resource.

29. A method for wireless communication by a network entity, comprising:
transmitting, to a user equipment (UE), a configuration indicating channel state feedback (CSF) reporting occasions;
transmitting a downlink (DL) transmission to the UE; and
receiving CSF from the UE on only some CSF reporting occasions after transmitting the DL transmission when one or more trigger conditions are met, wherein the one or more trigger conditions involve relative timing between a CSF reporting occasion on which CSF is received and at least one of:
a DL grant or semi-persistent scheduled (SPS) physical downlink shared channel (PDSCH); or
a measurement resource on which the received CSF is based.

30. The method of claim 29, wherein:
the measurement resource occurs at least a first threshold after the DL grant or SPS PDSCH; and
the CSF reporting occasion on which CSF is transmitted occurs at least at least one of:
a second threshold after the DL grant or SPS PDSCH; or
a third threshold after the measurement resource.

* * * * *